United States Patent [19]

Vogel et al.

[11] Patent Number: 5,604,794
[45] Date of Patent: Feb. 18, 1997

[54] SWITCH SYSTEM FOR DIRECTING CALL FROM A CALLING TO A RECEIVING INSTRUMENT

[75] Inventors: David A. Vogel, Westwood; Danny C. Vogel, Randolph; Diane P. Cherry, Foxboro, all of Mass.

[73] Assignee: Intertech Engineering Associates, Inc., Dedham, Mass.

[21] Appl. No.: 407,809

[22] Filed: Mar. 20, 1995

Related U.S. Application Data

[63] Continuation of Ser. No. 102,704, Aug. 5, 1993, abandoned, which is a continuation of Ser. No. 706,225, May 28, 1991, abandoned, which is a continuation-in-part of Ser. No. 384,772, Jul. 25, 1989, Pat. No. 5,056,132.

[51] Int. Cl.⁶ .................................................. H04M 11/00
[52] U.S. Cl. ........................... 379/94; 379/102; 379/100; 379/88
[58] Field of Search ................................. 375/89, 94, 96, 375/100, 157, 164, 102, 88, 8

[56] References Cited

U.S. PATENT DOCUMENTS

| | | | |
|---|---|---|---|
| 4,596,021 | 6/1986 | Carter et al. | 375/5 |
| 4,727,429 | 2/1988 | Ueno | 358/405 |
| 4,850,008 | 7/1989 | Berg et al. | 379/100 |
| 4,862,456 | 8/1989 | Giorgio | 375/8 |
| 4,958,153 | 9/1990 | Murata et al. | 379/142 |
| 5,018,191 | 5/1991 | Catron et al. | 379/100 |
| 5,025,469 | 6/1991 | Bingham | 375/8 |
| 5,291,549 | 3/1994 | Izumi | 379/213 |
| 5,303,298 | 4/1994 | Morganstein et al. | 379/213 |

OTHER PUBLICATIONS

"EMI'S SmarterFax Switch" by Electronic Modules, Inc.
Command Communications, Inc. "The Autoswitch TF4" 1987.
Lyben, Computer Systems "Autoswitch TF 500" May 1989.

Primary Examiner—Ahmad F. Matar
Attorney, Agent, or Firm—Ohlandt, Greeley, Ruggiero & Perle

[57] ABSTRACT

A switch system for directing a call from a calling instrument to a receiving instrument. The switch system comprises a call originator unit that is electrically connected between the calling instrument and an outgoing telephone line. The switch system also includes a call receiver unit that is electrically connected between an incoming telephone line and the receiving instrument. The incoming telephone line is electrically connected to the outgoing telephone line.

1 Claim, 7 Drawing Sheets

SWITCH SYSTEM FOR DIRECTING CALL FROM A CALLING TO A RECEIVING INSTRUMENT

RELATED INVENTION

This application is a continuation of application Ser. No. 08/102,704 filed Aug. 5, 1993 (now abandoned), which was a continuation of application Ser. No. 07/706,225 filed May 28, 1991 (now abandoned), which was a continuation-in-part of application Ser. No. 07/384,772 filed Jul. 25, 1989 and issued Oct. 8, 1991 as U.S. Pat. No. 5,056,132.

BACKGROUND OF THE INVENTION

1. Field of the Invention

The present invention relates to a communications switch system and, more particularly, to such a switch system that includes a call originator unit and a call receiver unit in order to implement a telephone line consolidation.

2. Description of the Prior Art

In the present local telephone switching devices, Touch (DTMF) Tones are used to provide call directions. Heretofore, there have been several drawbacks associated with the use of such tones. For example, the call originating device is typically unable to determine when the call receiving instrument has been connected and, therefore, cannot detect when to transmit call direction tones. Further, the call originating device typically cannot determine when the call receiving instrument has received the direction or selection tone.

Another drawback or disadvantage is that the call originating device must transmit the call direction tone within a very short time period. This time period starts when the receiving switch device is ready to detect the tone and ends just before the call is directed to a default device. The starting time of this period will vary. Specifically, the starting time of the time period is affected by the time it takes for a telephone call to traverse the originating caller's telephone central office, the long distance network, and the receiving caller's central office. Depending on the distance between the calling instrument and the call receiving instrument, one, two or all three of these delays may be interposed. The problem arises from the fact that the calling instrument, not knowing when the receiving switch device is ready to accept tones, must delay for the worst case connection time period, in addition to the detection time period. This long worst case delay will cause additional billable telephone time to the customer, and further, if it is too long, it may extend beyond the end of the detection time period causing the call receiving instrument to connect to the incorrect device. This would require another call attempt by the calling instrument also increasing telephone expense.

A further disadvantage is that if the calling instrument is automated, it typically has a limited ability to transmit the selection tones or to detect the results of the switch function. Accordingly, the incoming call can be lost.

A still further disadvantage is that the software for the calling instrument or device, such as a computer, may not have the capability of handling the number of characters that are needed to preprogram the long delays and the direction tones. Therefore, changes are required in existing software of the computer to insert sufficient pauses to ensure that any telephone line consolidation device has answered before the direction tone is sent. Also, the pauses will occur on the telephone line and, therefore, at the telephone caller's expense.

Accordingly, there has, heretofore, been a need for a communication system or device that interfaces with the calling instrument and an incoming telephone line having a receiving instrument and that uses the pulse or Touch (DTMF) Tones received from the calling instrument to direct the call to the receiving instrument. Further, such a communication device can be used without changes required in the originating device's software and without additional use of the telephone line. Still further, such a system needs to act within a very brief time period.

Furthermore, a need exists to cascade receiving switches to modularly increase the number of devices that can be addressed. This requires advanced abilities to transmit selection tones that include appropriate acknowledgment signals.

SUMMARY OF THE INVENTION

It is a primary object of the present invention to provide a switch system.

It is another object of the present invention to provide such a switch system that permits a calling instrument to direct an incoming call to a receiving instrument that shares a telephone line, without requiring any interaction from the calling or the receiving instruments.

It is still another object of the present invention to provide such a switch system that includes a call originator unit and a call receiver unit.

It is yet another object of the present invention to provide such a switch system that directs a call from a calling instrument to a receiving instrument and comprises a call originator unit that is electrically connected between the calling instrument and an outgoing telephone line and a call receiver unit that is electrically connected between an incoming telephone line that is electrically connected to the outgoing telephone line and the call receiving instrument.

These and other objects are provided for by a switch system for directing a call from a calling instrument to a receiving instrument. The switch system comprises a modem identifier unit electrically connected between the calling instrument and an outgoing telephone line. The modem identifier unit includes means for detecting the call from the calling instrument, means for operatively connecting the calling instrument to the outgoing telephone line, means for detecting whether a line selection is enabled and means, in response to the line selection enabled detecting means,. for transmitting a valid line selection tone. The switch system also comprises a call receiver unit electrically connected between an incoming telephone line electrically connected to the outgoing telephone line and a call receiving instrument. The call receiver unit including means for detecting the call, means for initiating an internal line selection detection mechanism that includes means for detecting whether the valid line selection tone is detected and means for determining that no line selection tone has been detected within a fixed amount of time.

BRIEF DESCRIPTION OF THE DRAWINGS

The foregoing and still other objects and advantages of the present invention will be more apparent from the following detailed explanation of the preferred embodiments of the invention in connection with the accompanying drawings wherein.

DESCRIPTION OF THE PREFERRED EMBODIMENTS

Figure 1:
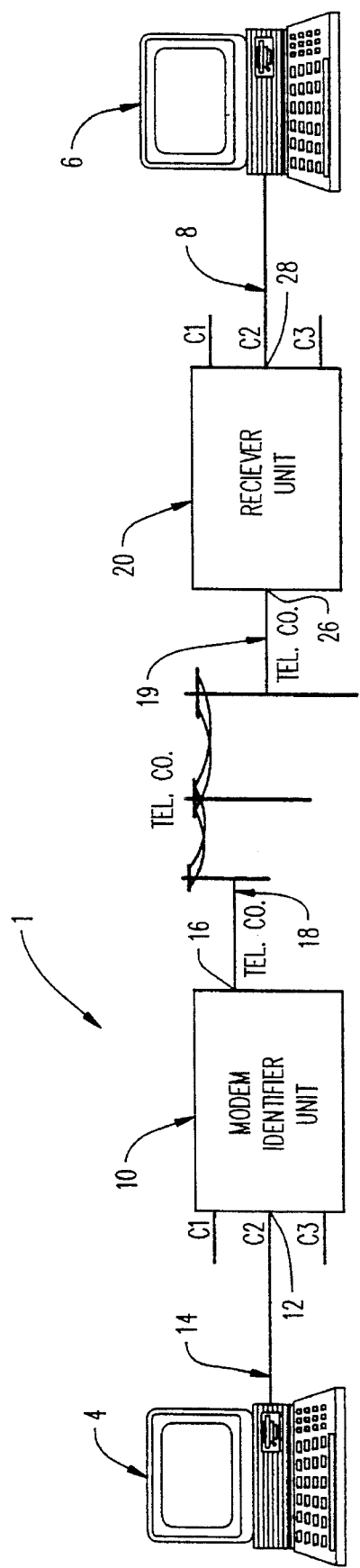
FIG. 1 is a block diagram of the switch system of the present invention.

Referring to the drawings and, in particular, FIG. 1, there is provided a switch system generally represented by reference numeral 1. The switch system 1 allows a calling instrument or device 4 to direct a telephone call to a call receiving instrument 6, that may or may not share an internal telephone line 8, without the elements of the switch system disrupting or interfering with the telephone call. The switch system 1 includes a call originator unit 10 and a call receiver unit 20.

The call originator unit 10 is a modem identifier unit or device ("MID"). The modem identifier unit 10 is electrically connected at point 12 to at least one internal telephone line and jack 14. The internal telephone line and jack 14 are used to connect electrically, and also physically, the calling instrument 4 to the modem identifier unit 10. The modem identifier unit 10 is also electrically connected at point 16 to an outgoing and, preferably, external telephone line 18.

The modem identifier unit 10 has certain detection capabilities as will be defined below. In addition, the modem identifier unit 10 can be configured to transmit line selection tones or, alternatively, an override mode will prevent the transmission of the line selection tones. When the modem identifier unit 10 has been configured by the user to transmit line selection tones, it does so at the appropriate times and until the modem identifier unit detects an acknowledgment tone back from the call receiver unit 20. Whether or not the modem identifier unit 10 has the ability to transmit line selection tones is determined by one of three different operating modes, namely by its physical connection to the calling instrument 4, the pre-programming of line selection tones and the transmission of a line selection over-ride tone by the calling instrument during the dialing sequence. In other words, the modem identifier unit 10 does transmit line selection tones if the modem identifier unit tone transmission for the unit and the particular connection port are both enabled and a default selection tone has been selected for the particular modem identifier unit connection port or the presence of an override tone or tones is detected in the dialing sequence generated by the calling instrument 4. If a default selection tone has been selected, and an override tone is detected, the override tone takes precedence. Also, an override tone might prevent a selection tone from being transmitted for a port that had a default tone enabled. The feature of a line selection override tone allows communications to be made through the modem identifier unit 10 without transmitting the line selection to locations that do not include a call receiver unit 20.

A preferred modem identifier unit 10, preferably, is a desktop unit that includes at least four jacks. In a preferred embodiment, the jacks are positioned in the rear of the unit. One jack is for the telephone line, while the remaining three jacks are for the devices of the internal telephone system. The modem identifier unit 10 may also include indicators, such as LED indicators, to advise the user of the configured option and to display the progress of the telephone call.

The call receiver unit 20 is known as a call receiver (RCVR) unit. It interfaces with a telephone line 19 and with the receiving instrument 6. The receiving instrument 6, like the calling instrument 4, is an internal telephone device. The internal telephone device may include one or more of the following devices, namely a telephone, facsimile machine, point of sale machine, computer modem or an alarm monitoring system. The internal telephone system may also include analogous modems and the like.

The call receiver unit 20 is electrically connected to the external telephone line 19 at point 26 and to at least one internal telephone line at jack 28 or port C2. The receiving instrument 6 is electrically connected to jack 28.

The function of the call receiver unit 20 is to receive incoming calls, determine which of the receiving devices the telephone call is intended for, regenerate the ring on the appropriate device port 28, detect the receiving device going off-hook in response to the ring signal, and finally connecting the call through, from the receiving unit 6 to the telephone company line 19.

U.S. application Ser. No. 07/384,772, filed Jul. 25, 1989, now U.S. Pat. No. 5,056,132, which issued on Oct. 8, 1991, which is owned by the assignee of the present application, describes how the call receiver unit 20 functions except that the present unit is also capable of acknowledging receipt of selection tones to the caller by responding with an acknowledgment tone. U.S. Pat. No. 5,056,132, which is incorporated herein by reference, provides that the call receiver unit 20 has the ability to detect and distinguish different DTMF tones from an incoming caller for the purpose of directing the call to the appropriate device port. Furthermore, the call receiver unit 20 has a programmable default port, to which incoming calls are directed if no other indication is received. Finally, the receiver unit 20 as described in U.S. Pat. No. 5,056,132 has the ability to generate digitized voice messages (or any other audible prompt) to greet, and/or direct incoming callers while the device is attempting to detect a direction tone.

The call receiver unit 20 may be programmed to enable or disable the transmission of the acknowledgment tone depending on the device selected. This programmability eliminates the transmission of acknowledgment for devices that are typically selected by non-modem identifier callers, such as, for example, normal voice telephone calls. The programmability is obtained locally by putting the receiver unit 20 into a "program mode" and programming with DTMF tones generated by a locally connected telephone. Alternatively, the receiver unit 20 can be programmed by a remote computer via DTMF tones. Remote programming is protected by an algorithm based password system so that an unauthorized caller cannot reconfigure remote receiver units.

Figure 2:
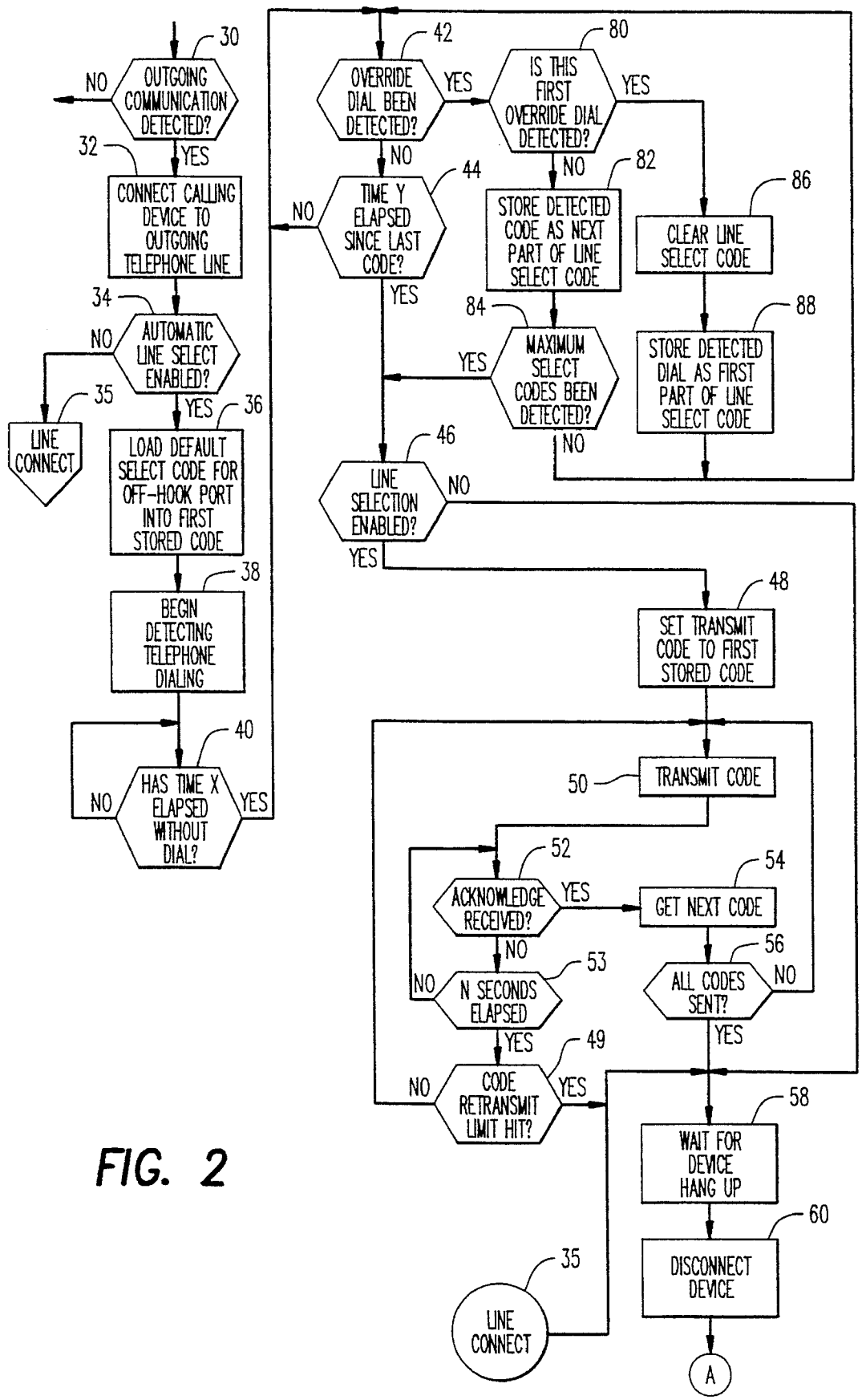
FIG. 2 is a flow chart of the operation of the originator unit of the switch system of the present invention.

FIG. 2 is a flow chart of the logic for the operation of the modem identifier unit 10. The modem identifier unit 10 is initiated by detection of the calling instrument going to its "off-hook" or operative condition. Accordingly, the modem identifier unit 10 includes a first detector to detect the operative condition of the calling instrument. In a preferred embodiment, the first detector, as shown by block 30, detects that the calling instrument is prepared to send an outgoing communication. After the modem identifier unit 10 detects (Yes in FIG. 2) the operative condition of the calling instrument, the calling instrument is operatively connected to the outgoing telephone line as shown by block 32.

The modem identifier unit 10 determines, as shown at block 34, whether the calling instrument is connected to an internal jack that provides for automated line selection. If the calling instrument is so connected, the modem identifier unit 10 will load the programmable default line select code or tone (block 36) for that jack. In addition, the modem identifier unit 10 will commence detection 38 of the DTMF (or touch) tones. If the calling instrument is not connected to an internal jack that provides for automated line selection, the telephone call will be directed to a connected line state 35 where it shall remain until the calling instrument hangs up or goes "on-hook" as shown by block 58.

The modem identifier unit 10 includes elements that implement the override tone feature, as shown by blocks 40, 42 and 44. In step 40, a first determinator determines whether a first time period of x seconds or greater has elapsed after detection of the last DTMF tone dialed by the calling instrument. If the answer is no or if it has not been determined, means 40 is reactivated. If the answer is yes, the modem identifier unit 10 determines by a second determining device, as shown by block 42, whether an over-ride dial or instruction has been detected. If no over-ride instruction has been detected and if a detector device, as shown by block 44, detects that a second time period of y seconds has elapsed since the last code without another tone being detected, the modem identifier unit 10 will determine, as shown by block 46, whether a valid line selection is still loaded and enabled and, if so, will commence transmission of the port selection tones to the dialed call receiver unit. If the line selection code is invalid or has been disabled by an override code, then no selection codes will be transmitted, and the modem identifier unit 10 will wait in the line connect state, block 35, for the calling instrument to hang up, or go "on hook" as detected in as shown by block 58. In the FIG. 4 embodiment, the value of the default line or port selection tone is equal to the port on the modem identifier unit 10 at which the calling instrument is connected. For example, if the calling instrument is connected to port C1 of the modem identifier unit 10, the default selection tone will be such that a connection will be made to the device on port C1 on the dialed call receiver unit 20.

The modem identifier unit 10 can be programmed so that the values of x and y can be made to be any period of time between about 0.5 and about 10 seconds. It is preferred that the value of x be about 1.5 seconds and the value of y be about 1.5 seconds. The values of both "x" and "y" are selected to be greater than the standard modem delay character (1 second), but less than two delay widths to speed the dialing process. These values are selected so that the calling instrument has ample pause time (x=y=1.5 seconds) between digits dialed on the outgoing call without triggering the default code selection. Furthermore, the sum of x+y should be kept less than the minimum time expected to complete a telephone call to keep the override specifier tones from being detected by the RCVR unit.

Referring back to FIG. 2, after it is affirmed that the line selection is enabled, the transmit code is set to a first stored code as shown in block 48. The code is then transmitted periodically by a transmitter, as shown by block 50, and after acknowledgment is received by a receiver, as shown by block 52, the next code is obtained, as shown by block 54, and transmitted. This is repeated until all of the codes are obtained and transmitted, see block 56. As a safety against an undetected port selection tone, or an undetected acknowledgment tone, a limit detector, as shown by block 49 is provided to allow the selection tones to "time out" after the re-transmit limit has been reached. In this way, the telephone line will not be held open an unnecessary length of time. At that time, a off-line detector, as shown by block 58, detects when the calling instrument has hung-up or moved to its inoperative condition and, therefore, service is disconnected as shown in 60.

If after the first code is transmitted by the transmitter, as shown by block 50, and an acknowledgment tone is not received by the receiver, as shown by block 52, it is then determined, as shown by block 54, whether n seconds has elapsed. If n seconds has elapsed, the telephone call or modem identifier unit's logic reenters means 50. If n seconds does not elapse, the modem identifier unit will reenter an acknowledgment detection mode by the receiver shown by block 52. The modem identifier unit 10 can be programmed at production time so that n seconds can be any number of seconds from about 0.1 to about 5.

Figure 3:
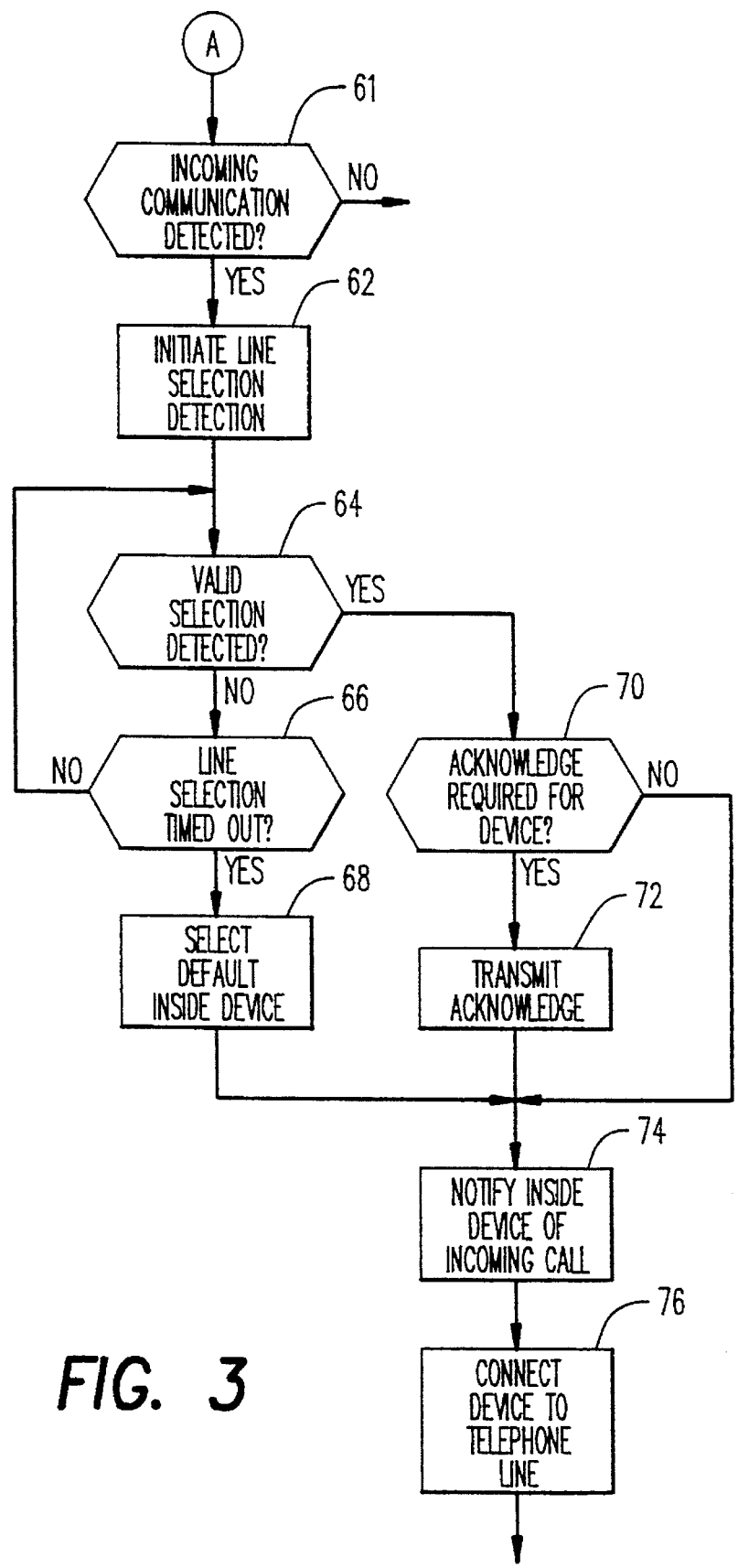
FIG. 3 is a flow chart of the operation of the receiver unit of the switch system of the present invention.

The operation of the call receiver unit 20 is illustrated in FIG. 3. The call receiver unit 20, upon detection of an incoming call by a detector, as shown by block 61, "picks up" the call and initiates, as shown by block 62, the internal line selection detection mechanism. This line selection detection mechanism includes a detector, as shown by block 64, for detecting whether a valid line selection tone is detected. The detector 64 also detects a device tone over the communications medium, such as, for example, a CNG tone for fax machines or a carrier tone for modems. The line selection a determiner, as shown by block 66, also includes means 66 that determines that no tone has been detected within a fixed amount of time.

If the detector shown by block 64 determines that no valid selection code has been detected, then the determiner shown by block 66 determines if the line selection time has expired. If it has not expired, the modem identifier unit logic and the telephone call are returned to the detector 64. If no valid selection is detected by the detector 64 and the line selection time has expired as determined by the determiner 66, the modem identifier unit's logic moves to a selector, as shown by block 68, to determine whether to select a default device. If means 64 determines that a valid selection code has been detected, the call receiver unit's logic continues, as shown by block 70, to determine whether the selected internal line has been programmed to provide an acknowledgment means for transmitting an acknowledgment instruction or tone. If an acknowledgment means is enabled, an acknowledgment tone is transmitted by a transmitter, as shown by block 72, over the communications medium to the caller such means for transmitting the acknowledgement tone is depicted as block 200 in FIG. 7. The internal receiving instrument is then notified by a notifier, as shown by block 74, of the communication and connected by a connection device, as shown by block 76, to the external telephone line. The call receiver unit 20 then waits to detect that the receiving instrument 6 has been "hung up" at which time it disconnects the telephone line and idles waiting for the next action.

Figure 4:
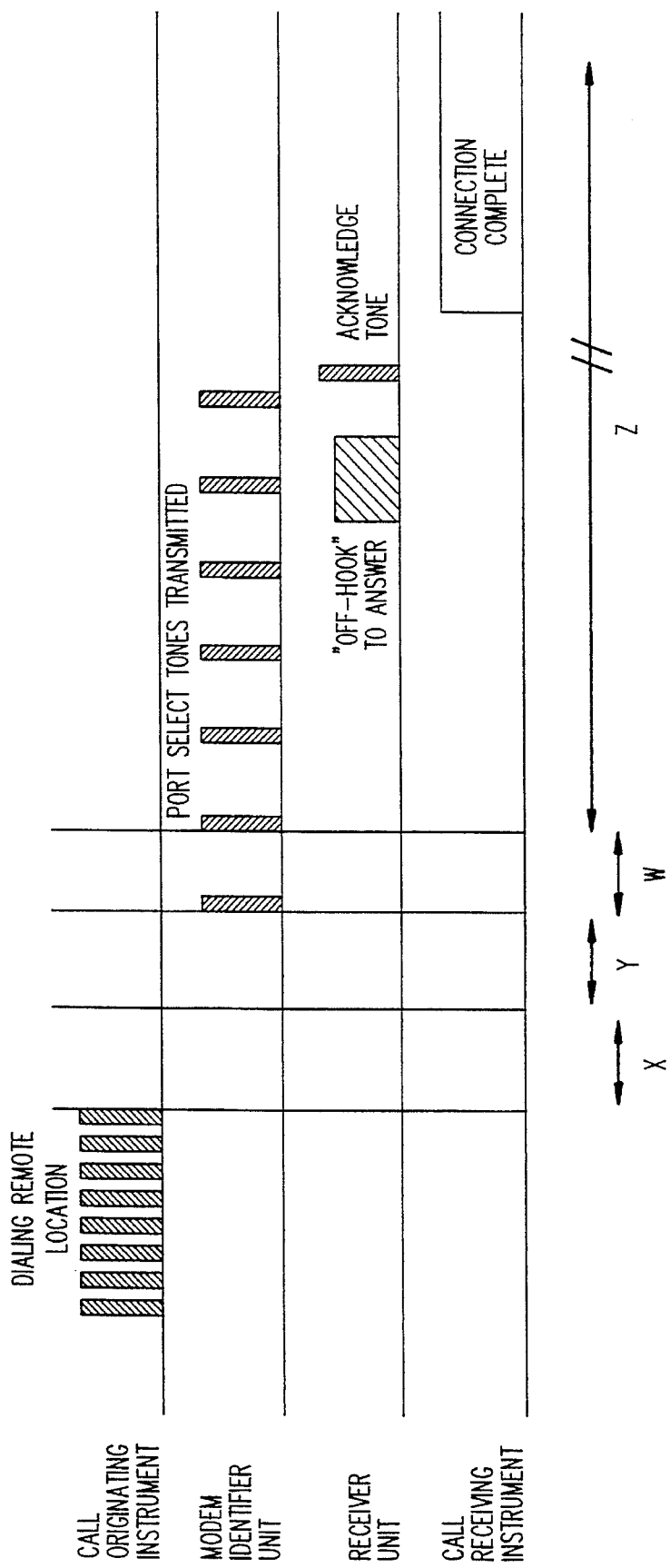
FIG. 4 is the logic of the line selection timing for the automated line select mode embodiment of the switch system of the present invention.

The use of the acknowledgment tone or signal allows the transmission of selection tones to be terminated as soon as the call receiver unit 20 detects the first tone as shown in FIG. 4.

If line selection feature is still enabled after the completion of the dialing and the time provided for the over-ride tone detection, the modem identifier unit 10 will commence transmitting line selection tones. These line selection tones are transmitted every w seconds for up to z seconds or until an acknowledgment tone is detected from the call receiver unit 20. Once the acknowledgment tone is detected by the modem identifier unit 10, the modem identifier unit waits to detect that the calling instrument 4 has gone "on hook" (e.g. hang up) or its non-operating condition. At this time, the electrical connection is released and the modem identifier unit 10 is in its idle mode in which it waits for the next call. As with other time periods in the modem identifier unit, the w and z seconds for the line selection tone can be programmed at production time.

Figure 5:
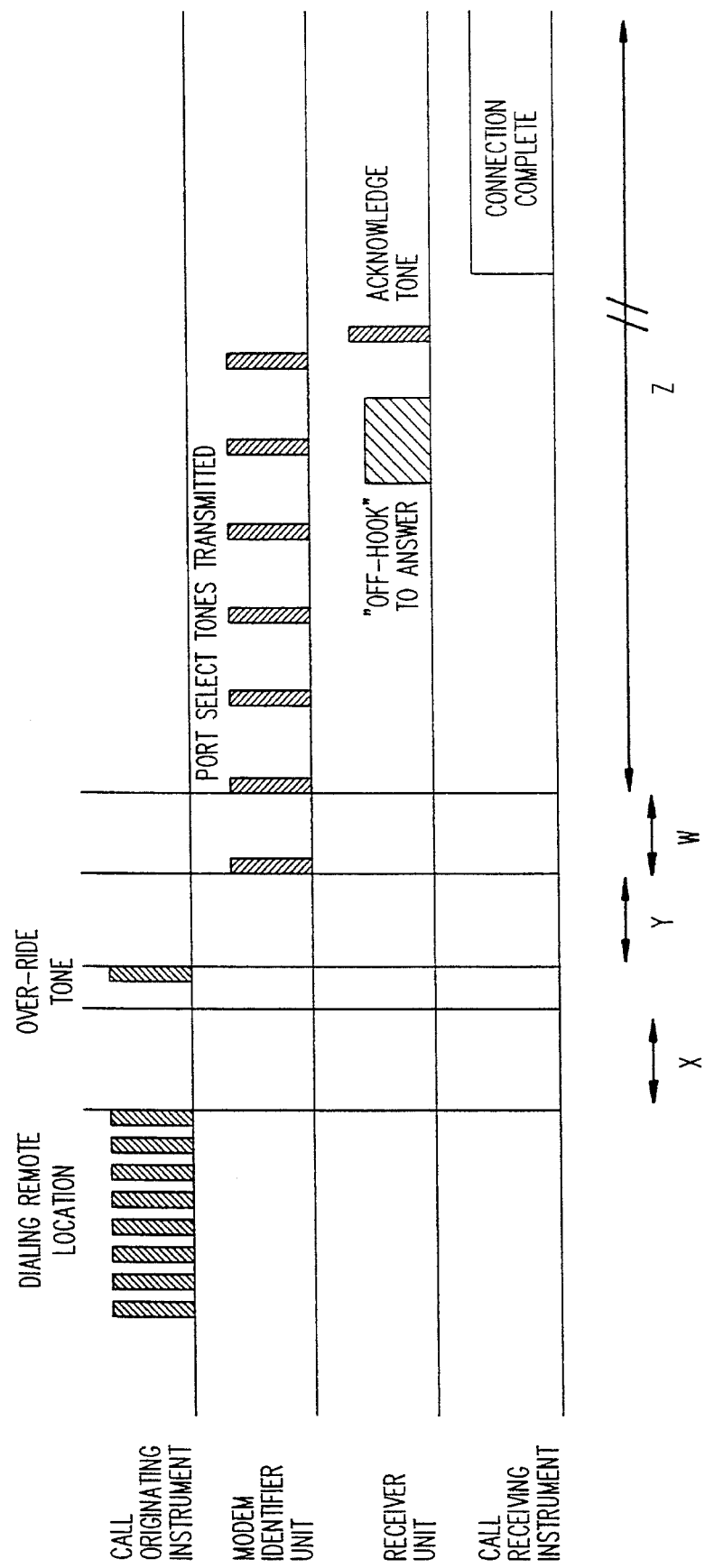
FIG. 5 is the logic of the line selection timing for the over-ride mode embodiment of the switch system of the present invention.

FIG. 5 is directed to an alternative embodiment in which it is necessary to direct a call to a non-standard port or to instruct the modem identifier unit 10 to send no direction tones. This situation might occur if a call receiving instrument 6 has not been installed. Accordingly, for these situations, an over-ride capability is needed. Referring to FIG. 2, DTMF tones detected after dialing by the calling instrument is complete and before an over-ride detection period of length y seconds are considered to be line selection override tones, see blocks 42, 80. The over-ride tones by means 82, 84, 86 and 88 over-ride elements, as shown by blocks 82, 84, 86 and 88 of FIG. 2, replace the default loaded line selection tone. Alternately, a special tone can disable the line selection feature for the current call. After detecting an over-ride tone, the call progresses as in the automated selection mode, however the over-ride tone or tones is/are substituted for the default selection tone.

Figure 6:
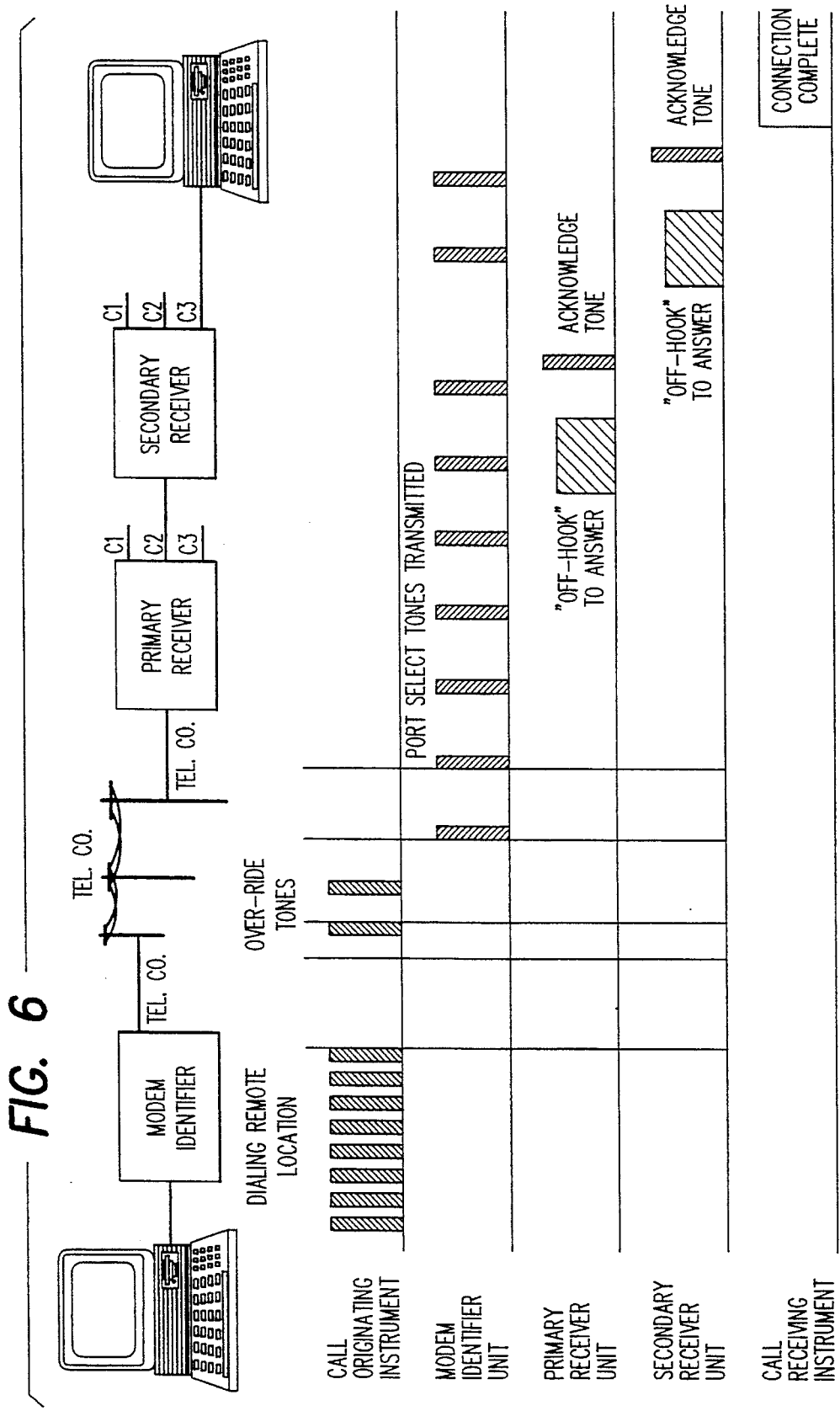
FIG. 6 is the logic of the line selection for another embodiment of the receiving unit of the switch system of the present invention.

As shown in FIG. 6, the use of acknowledgment tones allows several call receiver units 20 to be cascaded. This cascading permits the use of more internal telephone devices at the receiving instrument on the same telephone line. Without acknowledgment tones, the modem identifier unit 10 would be unable to determine when the primary call receiver unit has received the first line selection tone and, thus, would be unable to reliably transmit the line selection tones for the secondary, tertiary and other call receiver units at the appropriate times.

The cascaded call receiver units 20 attached to the primary call receiver unit or a subsequent call receiver unit can be accessed by the "over-ride" method or by pre-programmed default line selection codes. For example, an over-ride code of "23" would access a secondary call receiver unit attached to port C2 of the primary call receiver unit, and ring port C3 of the secondary call receiver unit. In the calling sequence, once an acknowledgment is received for connection through the primary call receiver unit, the modem identifier unit 10 begins transmitting the secondary line select tone in the same manner. When all line select tones have been transmitted, the modem identifier unit 10 waits to detect that the calling instrument 4 has completed the call by the "hang up" of the calling instrument.

Figure 7:
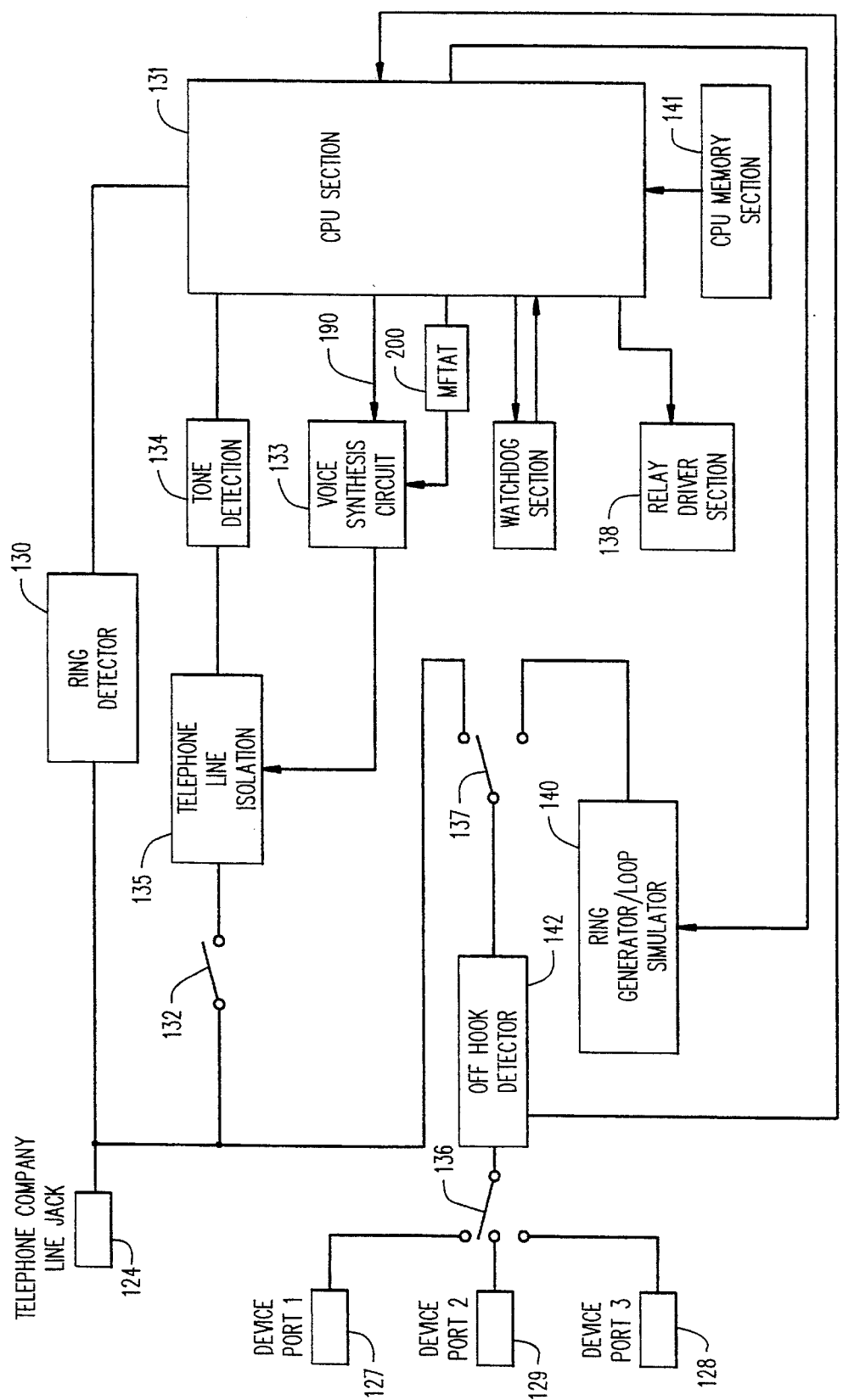
FIG. 7 is a block diagram of the interaction of components of the call receiver unit.

The modem identifier unit 10 may also act separately as a call receiver unit 20. The modem identifier unit is primarily intended to handle outgoing calls. However, it may also been designed to deal with incoming calls in the same way as a call receiver unit. For example, if a modem identifier unit is used primarily to connect to port C3 devices in the remote sites, the transmitting computer would be attached to port C3. A telephone could be connected to port C1, and port C1 would be programmed as the default port for incoming calls. Using these connections, a single telephone line to be used for computer room voice telephone access and routine data polling calls. The modem identifier unit, at present, does not have the ability to acknowledge incoming modem identifier tones or to be remotely reconfigured as normal receivers would be. However, these features can be incorporated therein. The modem identifier unit when used as a receiver will acknowledge incoming tones and will have the ability to be remotely configured the call receiver unit 20 is illustrated in more detail in FIG. 3 of U.S. Pat. No. 5,056,132 that has already been incorporated herein by reference. FIG. 7 herein is a block diagram of the interaction of the components of the call receiver unit 20, and this FIG. 7 shows a device essentially identical to the switch device or call receiver unit of FIG. 3 of U.S. Pat. No. 5,056,132.

The present switch system has many advantages since the calling instrument is not required to transmit any line selection tones, or perform any actions as part of the switching system. Further, the transmission of line selection tones continues only until the call receiver unit receives the communication and detects the line selection tone. This results in a savings of communications time and cost to the caller. In addition, this method allows multiple call receiver units to be cascaded, each requiring a line selection tone to "route" the communication. The modem identifier unit can detect each call receiver unit in order and transmit the necessary line selection tone for the unit thus providing the ability to share a single telephone line amongst a large number of internal telephone devices, and making it implementable in a modular fashion.

It has been found that by the use of the preferred embodiment of the present invention/that the normal delay added by the switch system is reduced to less than one second. It is believed that connecting a normal telephone call would take anywhere between five to twenty-five seconds. Accordingly, the software to reliably connect the normal telephone call using other switch devices would need to wait for at least the twenty-five seconds. Therefore, the telephone time used by the consumer is dramatically reduced by the use of the present switch system. This in turn reduces the consumer's telephone cost.

The present invention may, of course, be carried out in other specific ways than those set forth herein without departing from the spirit and essential characteristics of the present invention. The present embodiments are, therefore, to be considered in all respects as illustrative and not restrictive, and to provide for all changes coming within the meaning and equivalency range the appended claims are intended to embrace.

Wherefore we claim:

1. A switch system comprising:

a modem identifier unit operatively connected to a calling instrument to receive a signal from the calling instrument; and a switch device connected to the modem identifier unit through a telephone line;

said modem identifier unit having means for transmitting a first code along the telephone line to said switch device upon receipt of the signal from the calling instrument;

said switch device for receiving an incoming communication over the telephone line and being adapted to interface between the telephone line and an internal telephone system that includes a telephone, a facsimile machine, and an auxiliary device, said switch device including:

a) connector means for connecting said switch device to the telephone line for receiving the incoming communication;

b) ring detector means connected to said connector means for detecting a ring signal of the incoming communication;

c) a central processing unit, connected to and being alerted by said ring detector means, for initiating a program for answering the incoming communication;

d) a voice synthesis circuit, responsive to said central processing unit, for identifying the internal telephone system to a caller and requesting a second code from the caller that identifies the incoming communication;

e) code detection means for receiving and for classifying the incoming communication based on said second code, said code detection means includes default means for defaulting to a preselected one of a telephone, the facsimile machine and the auxiliary device should the caller fail to provide a proper second code thereby assuring that no incoming communication will be lost;

f) means for programming the default means to the preselected one of the telephone, facsimile machine or the auxiliary device;

g) means for ringing one of the telephone, the facsimile machine or the auxiliary device of the internal telephone system in accordance with the classification of the incoming communication; and h) means for blocking out access to the other two of the internal telephone system; and i) means for transmitting an acknowledgment tone to said modem identifying unit from said switch device, wherein said acknowledgment tone acknowledges the receipt of said first code.

* * * * *